United States Patent [19]
Riddel

[11] 4,098,368
[45] Jul. 4, 1978

[54] ROAD SPEED CONTROL WITH REDUNDANT RELEASE

[75] Inventor: John W. Riddel, Fenton, Mich.

[73] Assignee: General Motors Corporation, Detroit, Mich.

[21] Appl. No.: 632,402

[22] Filed: Nov. 17, 1975

[51] Int. Cl.² ............................................. B60K 31/00
[52] U.S. Cl. ................................ 180/108; 123/103 R
[58] Field of Search ......................... 180/108; 123/103

[56] References Cited

U.S. PATENT DOCUMENTS

| | | | |
|---|---|---|---|
| 1,055,741 | 3/1913 | Halbleib | 180/105 R |
| 3,087,340 | 4/1963 | McMurray et al. | 180/108 |
| 3,196,904 | 7/1965 | Schniers | 123/103 |
| 3,524,516 | 8/1970 | Bremmann | 180/108 |
| 3,557,898 | 1/1971 | Emery | 180/108 |
| 3,921,751 | 11/1975 | Sakakibara et al. | 180/108 |

*Primary Examiner*—John P. Silverstrim
*Attorney, Agent, or Firm*—D. D. McGraw

[57] ABSTRACT

A vehicle road speed control system having a redundant release valve assembly. A solenoid control actuated control valve energized by application of the vehicle brakes dumps the higher pressure side of the servomotor to the lower pressure side to balance the pressures on the power wall. The power wall return spring and the throttle valve return spring respectively return the power wall and the throttle valve to the closed throttle position. If the effective opposed areas of the power wall are substantially different, a bleed orifice is utilized to offset the difference. The servomotor output rod extends through the higher pressure servomotor chamber in two illustrated embodiments and through the lower servomotor pressure chamber in another embodiment.

5 Claims, 3 Drawing Figures

ROAD SPEED CONTROL WITH REDUNDANT RELEASE

The invention relates to a vehicle road speed control system and more particularly to one which has a redundant release arrangement to more quickly move the servomotor toward the zero throttle position and permit the throttle valve return spring to more quickly move the throttle valve toward the closed throttle position. The system in which the invention is embodied is illustrated as being of the same type disclosed and claimed in patent appliction Ser. No. 632,398 filed on even date herewith in the name of John A. Carol, Jr. et al entitled "Differential Pressure Power Road Speed Controls" and assigned to the common assignee. The system receives a superatmospheric vehicle engine generated first pressure in one power chamber of a servomotor and a subatmospheric vehicle engine generated fluid pressure in another servomotor chamber on the opposite side of the servomotor power wall from the first noted chamber. Restrictive orifices are provided to act on the pressures received by the two chambers. A control valve acts in cooperation with one of the orifices to control the amount of subatmospheric pressure received by the servomotor in order to maintain a predetermined vehicle road speed. A release valve is provided in the system and is normally closed. When its solenoid is energized by application of the vehicle brakes, it communicates the subatmospheric pressure to the superatmospheric power chamber of the servomotor directly and independently of the restrictive orifice. The superatmospheric pressure is connected through another restrictive orifice to the superatmospheric chamber so that while the release valve is open it precludes movement of the servomotor power wall in a direction tending to open the throttle valve.

The servomotor power wall output rod may extend through the superatmospheric pressure chamber wall provided by a part of the servomotor housing so that the power wall has a slightly lesser effective area on the superatmospheric pressure side than on the subatmospheric pressure side. A suitable seal is provided to prevent leakage from the superatmospheric pressure chamber. In one embodiment of this type the output rod is a small wire which extends through a seal chamber fluidly separate from the superatmospheric pressure chamber and on the other side of the housing portion therefrom. The seal chamber is operatively fluid connected in continuous fluid communication with the servomotor subatmospheric pressure chamber to evacuate any fluid passing through the output member seal from the superatmospheric pressure chamber.

The power wall output member may extend from the power wall through the subatmospheric chamber, decreasing the effective area of the power wall exposed to the subatmospheric pressure chamber in relation to the effective area of the power wall exposed to the superatmospheric pressure chamber. This arrangement will assure that a pressure differential across the power wall having a resultant force acting in a direction tending to open the throttle valve does not exist while the release valve is actuated.

Figure 1:
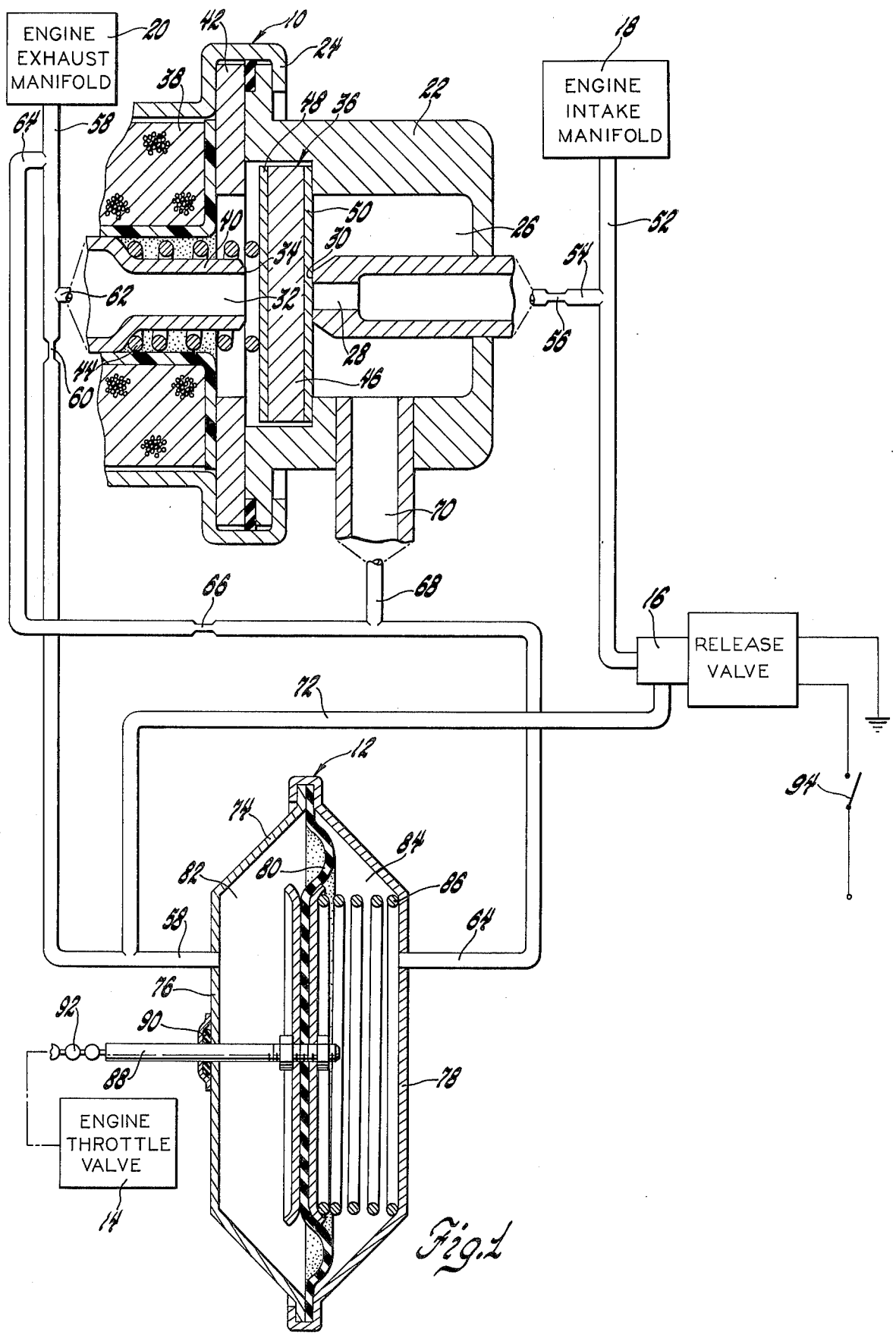
FIG. 1 is a schematic illustration of a portion of a vehicle road speed control system embodying the invention with parts broken away and in section.

The system of FIG. 1 includes a control valve assembly 10 which is controlled by appropriate signals received from a control signal generator to proportion differential pressures and thereby generate a control pressure. The servomotor 12 utilizes the various pressures in the system to selectively control the engine throttle valve 14 in a manner to be described. A release valve 16 forms a part of the system. The vehicle engine acts as the source of the different pressures utilized, as disclosed in the above noted application. The subatmospheric pressure is generated in the engine intake manifold 18, and is usually known as engine intake vacuum. The superatmospheric pressure is the exhaust back pressure generated in the engine exhaust manifold 20. The invention may also be utilized with the higher of the two pressures being atmospheric air, but will hereinafter be described as utilizing exhaust back pressure.

The control valve assembly 10 has a housing including a valve housing section 22 and a solenoid housing section 24. A valve chamber 26 is formed in the valve housing section and has an inlet port 28 connected therewith through an annular valve seat 30. Another inlet port 32 is connected with valve chamber 26 through another annular valve seat 34. The valve seats are axially aligned and oppositely disposed so that the valve member 36, received in chamber 26, can close either of the valve seats while opening the other. The solenoid coil 38 in housing section 24 has a core 40 through which inlet port 32 is formed, with valve seat 34 being formed on the end of the core extending into valve chamber 26. An annular field plate 42 forms a part of the wall of valve chamber 26 about but radially spaced from valve seat 34. Valve spring 44 acts against a shoulder on core 40 and one side of valve member 36 to continually urge the valve member in a position wherein valve seat 30 is closed and valve seat 34 is open. As more particularly set forth in copending application Ser. No. 632,399 (now U.S. Pat. No. 4,005,733) filed in the name of John W. Riddel on even date herewith, entitled "Pressure Control Valve", and assigned to the common assignee, valve member 36 is of a sandwich construction with a major center section 46 being of a magnetically soft ferromagnetic material, and the opposed outer sections or layers 48 and 50 being of a hard nonmagnetic material such as nonmagnetic stainless steel. The outer layers are thin relative to the center section of the valve member. Outer section 48 provides a small magnetic gap between the magnetically attractive center portion 46 and the valve seat 34 and field plate 42 so that when solenoid coil 38 is deenergized a quicker valve release may be obtained. This permits more accurate valve timing. The hard outer sections of the valve member 36 also prevent valve wear. Outer section 50 may be omitted provided care is taken during assembly to be sure that section 48 is oriented toward field plate 42.

The engine intake manifold 18 is connected by conduit 52 to one side of release valve 16. A branch conduit 54, containing a restrictive orifice 56, is connected to control valve assembly port 28. The engine exhaust manifold 20 is connected by conduit 58 through restrictive orifice 60 to the servomotor 12, as will be described. A branch conduit 62 connected with conduit 58 upstream of orifice 60 from the exhaust manifold is also connected with port 32 of the control valve assembly. Another branch conduit 64 is connected to conduit 58 intermediate the exhaust manifold 20 and the restrictive orifice 60. Conduit 64 has a restrictive orifice 66 therein. Conduit 64 is connected to servomotor 12 as will be described. A branch conduit 68 is connected with valve chamber 26 through outlet port 70 to conduit 64 intermediate restrictive orifice 66 and the servomotor 12. Another conduit 72 connects the other side of release valve 16 with conduit 58 intermediate restrictive orifice 60 and the servomotor 12.

The servomotor 12 includes a housing 74 defined by housing sections 76 and 78. A power wall 80 within housing 74 cooperates with housing section 76 to define a chamber 82 which will be referred to as a superatmospheric pressure chamber. The power wall also cooperates with housing section 78 to define another power chamber 84 which will be referred to as the subatmospheric or control pressure chamber. A power wall return spring 86 is positioned in chamber 84 so that it continually urges the power wall in a direction tending to decrease the volume of chamber 82 and increase the volume of chamber 84. Conduit 58 is connected in continuous communication with chamber 82 and conduit 64 is connected in continuous fluid communication with chamber 84. An output member 88 extends from the power wall 80 through a suitable seal 90 in housing section 76 and is connected by a chain 92 to the engine throttle valve 14. Chain 92 may take any of several well known forms so long as it permits the throttle valve 14 to move in the opening direction without interference by the servomotor 12, but transmits servomotor tension force to the throttle valve to open the throttle valve to the required position when the system is operating independently of the usual accelerator pedal controls.

When the system is in the inactive condition, solenoid coil 38 is not energized and release valve 16 is closed. The valve member 36 of the control valve assembly is positioned to close valve seat 30, leaving valve seat 34 open to chamber 26. Thus engine exhaust pressure is transmitted through conduit 58 to chamber 82. It is also transmitted through conduits 58 and 62, valve chamber 26 and conduit 68, and conduit 64, to chamber 84. Intake manifold pressure exists in conduit 72.

When the system is actuated, solenoid coil 38 is selectively energized and deenergized at appropriate frequencies and duty cycles to move valve member 36 between valve seats 30 and 34, generating a control pressure in valve chamber 26. This pressure is a modified form of the intake manifold vacuum, and is so described and claimed herein. The higher pressure of the system, disclosed herein as engine exhaust manifold pressure, is the pressure utilized under control of valve assembly 10 to modify the lower pressure. The control pressure is transmitted through port 70 and conduit 68 to the portion of conduit 64 intermediate restrictive orifice 66 and chamber 84. Due to the restrictive effect of orifice 66, the control pressure is imposed in chamber 84. Exhaust pressure continues to exist in chamber 82. Since the control pressure is not as high as the exhaust pressure, a differential pressure is caused to exist across power wall 80. The force generated by the differential pressure overcomes the force of spring 86, moving power wall 80 and the output rod 88 rightwardly as seen in FIG. 1. This movement is transmitted through chain 92 in tension to the engine throttle valve 14, positioning the throttle valve at the proper opening to provide the desired vehicle speed. Changes in engine power demands are reflected in appropriate control signals delivered to solenoid coil 38, which change the control pressure delivered to servomotor chamber 84. The modified pressure differential which results repositions power wall 80 to reposition the throttle valve 14 to change the engine power necessary to maintain the desired vehicle speed.

When the system is deactuated, a switch 94 in the control circuit for the release valve 16 is actuated to cause the release valve 16 to open. Switch 94 may be closed by brake applying movement of the brake pedal. At the same time, solenoid coil 38 is completely deenergized so that no control signals are being received by it. Valve spring 44 moves valve member 36 to close valve seat 30. Engine exhaust manifold pressure is therefore transmitted through conduit 64 to chamber 84, tending to balance the pressure differential across power wall 80. Spring 86, aided by the slightly larger effective area of power wall 80 exposed to chamber 84, moves the power wall toward the throttle valve closing position and holds it there. The engine throttle valve 14 may then be closed by the throttle valve return spring since chain 92 is slack. The throttle valve is then subject only to manual control by the vehicle operator by means of the usual accelerator pedal and linkage. The opening of release valve 16 also communicates engine intake manifold vacuum without restriction from conduit 52 through conduit 72 to chamber 82. Its effect is predominant due to the presence of restrictive orifice 60 in conduit 58. Therefore the differential pressure acting on power wall 80 is reversed as compared to the differential pressure during system operation, further aiding in the movement of the power wall 80 leftwardly. This differential pressure continues to exist across power wall 80 while the system is deenergized and release valve 16 is open so as to preclude movement of the power wall rightwardly.

When the vehicle brakes are released and switch 94 again opens, release valve 16 closes and exhaust manifold pressure is reestablished in chamber 82. It does not move power wall 80, however, since it is also established in chamber 84.

Figure 2:
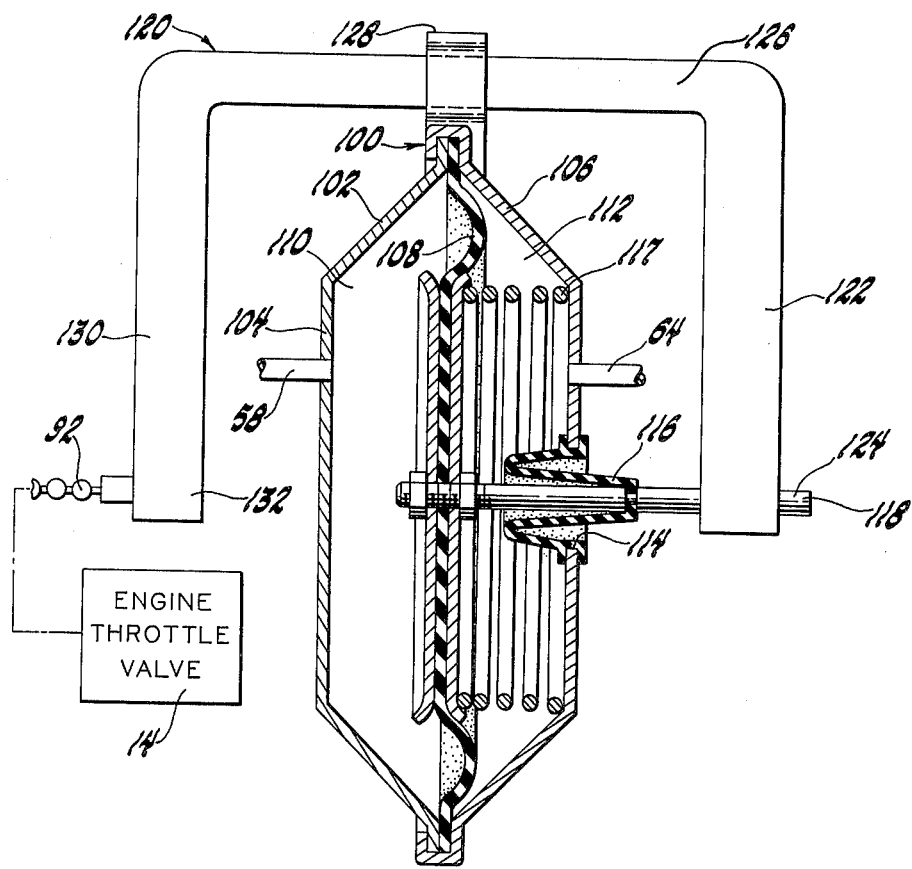
FIG. 2 is a cross section view of a modified servomotor similar to the servomotor of the system of FIG. 1.

FIG. 2 shows a modified servomotor that may be utilized in the system of FIG. 1. The servomotor has the power wall output member passing through the lower pressure chamber instead of the high pressure chamber. Servomotor 100 has a housing 102 composed of housing sections 104 and 106. A power wall 108 divides the housing into chambers 110 and 112. Housing section 104 defines one wall of chamber 110 and conduit 58 is connected to chamber 110 through this housing section. Housing section 106 defines a wall of chamber 112 and conduit 64 connects with that chamber through the housing section. An opening 114 in housing section 106 has seal 116 mounted therein and receives the power wall output member 118 therethrough. Spring 117 in chamber 112 acts on power wall 108 to urge it leftwardly toward housing section 104. A generally U-shaped transfer member 120 has one arm 122 attached to the outer end 124 of output member 118. The transfer member extends across the servomotor so that its center section 126 is slidably received in a guide bracket 128 secured to the housing 102. The other arm 130 of transfer member 120 extends parallel to arm 122 so that its end 132 is in axial alignment with the output member 118 but on the opposite side of the servomotor housing from that member. Arm end 132 is connected to chain 92, which in turn is connected to the engine throttle valve 14. The transfer member 120 transfers the force application from the power wall output member to the other side of the servomotor so that the chain may be tensioned by the servomotor as before. By having the output member 118 extend through chamber 112, the side of power wall 108 exposed to pressure in chamber 112 has a lesser effective area than the side of the power wall exposed to pressure in chamber 110. This assures that a pressure differential acting across the power wall and having a resultant force in the direction of chamber 112 does not exist when the release valve 16 is actuated.

Figure 3:
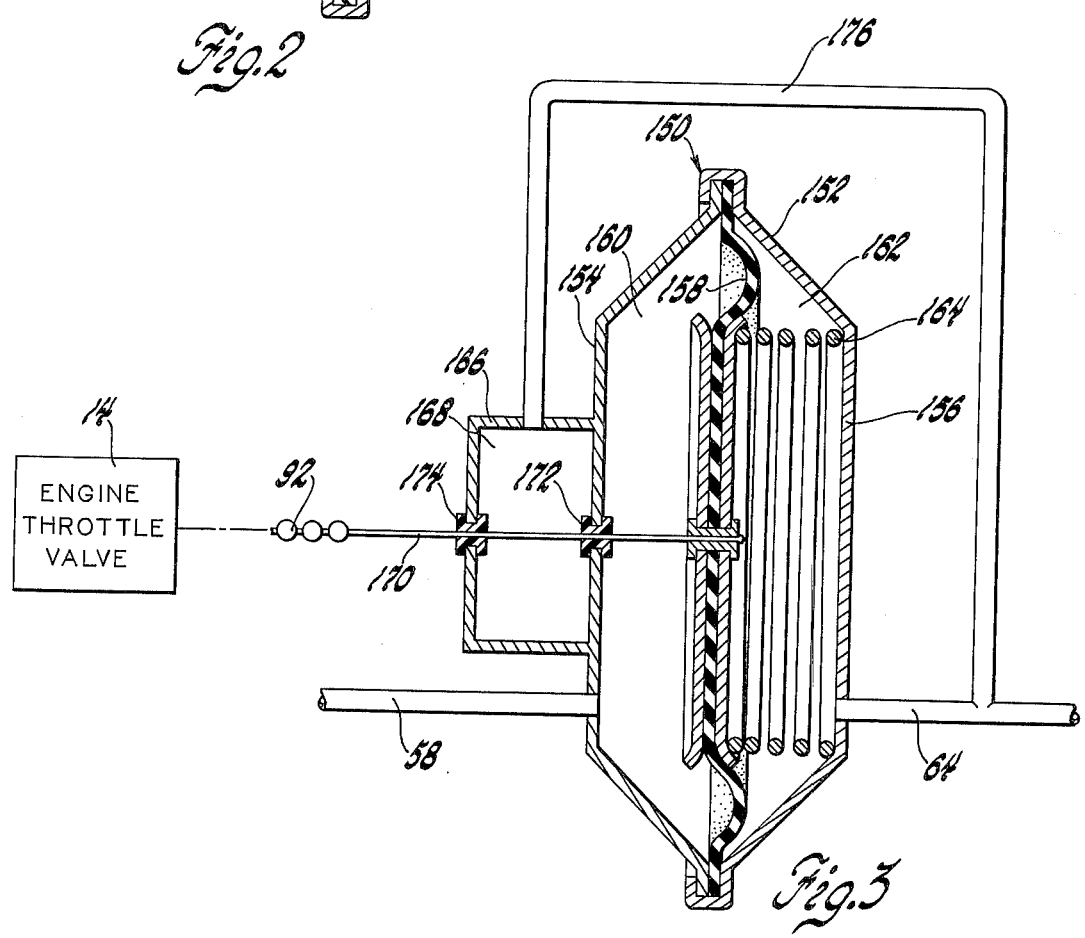
FIG. 3 illustrates in cross section another servomotor modification.

The modified servomotor shown in FIG. 3 is similar to that shown in the system of FIG. 1 in that the output member extends through the higher pressure chamber. Servomotor 150 has a housing 152 including housing sections 154 and 156. A power wall 158 in the servomotor divides the housing into separate chambers 160 and 162. Housing section 154 defines one wall of chamber 160 and housing section 156 defines one wall of chamber 162. A spring 164 in chamber 162 urges power wall 158 leftwardly as seen in the drawing. The housing section wall 154 has a portion 166 which defines a seal chamber 168. The power wall output member 170 extends through a seal 172 in housing section 154, chamber 160, and a seal 174 in housing section portion 166. The output member 170 is preferably a small wire so as to have a small effective area differential on opposite sides of power wall 158. It is connected to chain 92, which is in turn connected to engine throttle valve 14 as before. Conduit 58 is connected with chamber 160 and conduit 64 is connected with chamber 162. Another conduit 176 connects chamber 168 with conduit 64. Therefore the seal chamber 168 is operatively connected in continuous fluid communication with the servomotor chamber 162 so as to evacuate any fluid passing through seal 172 from chamber 160. The small wire utilized as the output member 170 minimizes the friction losses where it extends through seals 172 and 174 but still provides a differential effective area across power wall 158 sufficient to assure that a pressure differential across the power wall having a resultant force acting in the direction of chamber 162 does not exist when the release valve 16 is actuated. The evacuation of seal chamber 168 to the lower pressure of chamber 162, when used in the system of FIG. 1 wherein exhaust gases are in chamber 160, insures that any exhaust gases passing seal 172 flow into the vacuum side of the system and do not escape into the atmosphere where the servomotor is located.

It is claimed:

1. A vehicle road speed control system comprising:
  means for producing a first fluid pressure;
  means for producing a second fluid pressure less than said first fluid pressure;
  a control valve;
  first conduit means interconnecting said first fluid pressure producing means and one side of said control valve for delivering said first fluid pressure thereto;
  second conduit means interconnecting said second fluid pressure producing means and said control valve;
  a restrictive orifice in said second conduit means for delivering a restricted value of said second fluid pressure to the other side of said control valve, said control valve variably combining said first fluid pressure and said restricted value of said second fluid pressure in response to vehicle speed to produce a control pressure;
  a servomotor including a housing and a movable power wall dividing said housing into two chambers, movement of said power wall affecting vehicle road speed;
  third conduit means interconnecting said first fluid pressure producing means and one of said chambers;
  a restrictive orifice in said third conduit means for delivering a restricted value of said first fluid pressure to said one chamber;
  fourth conduit means interconnecting said control valve to the other of said chambers to deliver said control pressure thereto;
  and a normally closed release valve interconnecting said third conduit means and said second fluid pressure producing means for communicating said restricted value of said first fluid pressure and said second fluid pressure when said release valve is actuated to an open position.

2. A vehicle road speed control system comprising:
  means for producing a first fluid pressure;
  means for producing a second fluid pressure less than said first fluid pressure;
  a control valve;
  first conduit means interconnecting said first fluid pressure producing means and one side of said control valve for delivering said first fluid pressure thereto;
  second conduit means interconnecting said second fluid pressure producing means and said control valve;
  a restrictive orifice in said second conduit means for delivering a restricted value of said second fluid pressure to the other side of said control valve, said control valve variably combining said first fluid pressure and said restricted value of said second fluid pressure in response to vehicle speed to produce a control pressure;
  a servomotor including a housing and a movable power wall dividing said housing into two chambers, movement of said power wall affecting vehicle road speed;
  third conduit means interconnecting said first fluid pressure producing means and one of said chambers;
  a restrictive orifice in said third conduit means for delivering a restricted value of said first fluid pressure to said one chamber;
  fourth conduit means interconnecting said control valve to the other of said chambers to deliver said control pressure thereto;
  and a normally closed release valve interconnecting said third conduit means and said second fluid pressure producing means for communicating said restricted value of said first fluid pressure and said second fluid pressure when said release valve is actuated to an open position; the effective area of said power wall exposed to the one of said chambers being sufficiently different from the effective area of said power wall exposed to the other of said chambers to assure that a resultant force generated by a pressure differential acting across said power wall and tending to move said power wall in a direction to increase vehicle speed does not occur when said release valve is actuated to an open position.

3. A vehicle road speed control system comprising:
means for producing a first fluid pressure;
means for producing a second fluid pressure less than said first fluid pressure;
a control valve;
first conduit means interconnecting said first fluid pressure producing means and one side of said control valve for delivering said first fluid pressure thereto;
second conduit means interconnecting said second fluid pressure producing means and said control valve;
a restrictive orifice in said second conduit means for delivering a restricted value of said second fluid pressure to the other side of said control valve, said control valve variably combining said first fluid pressure and said restricted value of said second fluid pressure in response to vehicle speed to produce a control pressure;
a servomotor including a housing and a movable power wall dividing
said housing into two chambers, movement of said power wall affecting vehicle road speed;
third conduit means interconnecting said first fluid pressure producing means and one of said chambers;
a restrictive orifice in said third conduit means for delivering a restricted value of said first fluid pressure to said one chamber;
fourth conduit means interconnecting said control valve to the other of said chambers to deliver said control pressure thereto;
and a normally closed release valve interconnecting said third conduit means and said second fluid pressure producing means for communicating said restricted value of said first fluid pressure and said second fluid pressure when said release valve is actuated to an open position;
said power wall having an output member secured thereto and extending from only one power wall side through and beyond one of said chambers and decreasing the effective area of the power wall one side, said output member effectively decreasing the active area of the power wall one side to less than the active area of the power wall other side and assuring that a pressure differential acting across said power wall while said release valve is actuated to an open position generates a force tending to decrease vehicle speed.

4. A vehicle road speed control system comprising:
means for producing a first fluid pressure;
means for producing a second fluid pressure less than said first fluid pressure;
a control valve;
first conduit means interconnecting said first fluid pressure producing means and one side of said control valve for delivering said first fluid pressure thereto;
second conduit means interconnecting said second fluid pressure producing means and said control valve;
a restrictive orifice in said second conduit means for delivering a restricted value of said second fluid pressure to the other side of said control valve, said control valve variably combining said first fluid pressure and said restricted value of said second fluid pressure in response to vehicle speed to produce a control pressure;
a servomotor including a housing and a movable power wall dividing said housing into two chambers, movement of said power wall affecting vehicle road speed;
third conduit means interconnecting said first fluid pressure producing means and one of said chambers;
a restrictive orifice in said third conduit means for delivering a restricted value of said first fluid pressure to said one chamber;
fourth conduit means interconnecting said control valve to the other of said chambers to deliver said control pressure thereto;
a normally closed release valve interconnecting said third conduit means and said second fluid pressure producing means for communicating said restricted value of said first fluid pressure and said second fluid pressure when said release valve is actuated to an open position;
said power wall having an output member secured thereto and extending from only one power wall side through and beyond one of said chambers and decreasing the effective area of the power wall one side, said output member effectively decreasing the active area of the power wall one side to less than the active area of the power wall other side and assuring that a pressure differential acting across said power wall while said release valve is actuated to an open position generates a force tending to decrease vehicle speed;
said output member also extending through a sealed opening in said servomotor housing;
and a seal chamber provided on the servomotor housing at the sealed opening, said output member also extending through and beyond said seal chamber;
and fifth conduit means maintaining said seal chamber in continuous fluid communication with the servomotor chamber through which said output member does not extend to evacuate fluid passing through the sealed opening from the one chamber into the seal chamber and further assure that a pressure differential acting across said power wall while said release valve is actuated to an open position generates a force tending to decrease vehicle speed.

5. A vehicle road speed control system comprising:
means for producing a first fluid pressure;
means for producing a second fluid pressure less than said first
fluid pressure;
a control valve;
first conduit means interconnecting said first fluid pressure producing means and one side of said control valve for delivering said first fluid pressure thereto;
second conduit means interconnecting said second fluid pressure producing means and said control valve;
a restrictive orifice in said second conduit means for delivering a restricted value of said second fluid pressure to the other side of said control valve, said control valve variably combining said first fluid pressure and said restricted value of said second fluid pressure in response to vehicle speed to produce a control pressure;
a servomotor including a housing and a movable power wall dividing said housing into two chambers, movement of said power wall affecting vehicle road speed;

third conduit means interconnecting said first fluid pressure producing means and one of said chambers;

a restrictive orifice in said third conduit means for delivering a restricted value of said first fluid pressure to said one chamber;

fourth conduit means interconnecting said control valve to the other of said chambers to deliver said control pressure thereto;

a normally closed release valve interconnecting said third conduit means and said second fluid pressure producing means for communicating said restricted value of said first fluid pressure and said second fluid pressure when said release valve is actuated to an open position;

said power wall having a small wire output member secured thereto and extending from only one power wall side through and beyond one of said chambers, said output member also extending through a sealed opening in said servomotor housing, the sealed opening being capable of slight fluid leakage;

a seal chamber provided on the servomotor housing at the sealed opening, said output member also extending through and beyond said seal chamber;

and fifth conduit means maintaining said seal chamber in continuous fluid communication with the servomotor chamber through which said output member does not extend to evacuate fluid passing through the sealed opening from the one chamber into the seal chamber and assure that a pressure differential acting across said power wall while said release valve is actuated to an open position generates a force tending to decrease vehicle speed.

* * * * *